(12) United States Patent
Hikosaka

(10) Patent No.: US 11,054,585 B2
(45) Date of Patent: Jul. 6, 2021

(54) OPTICAL CONNECTOR, TERMINAL END STRUCTURE FOR AN OPTICAL FIBER

(71) Applicant: Yazaki Corporation, Tokyo (JP)

(72) Inventor: Tomohiro Hikosaka, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/908,025

(22) Filed: Jun. 22, 2020

(65) Prior Publication Data
US 2021/0026081 A1  Jan. 28, 2021

(30) Foreign Application Priority Data
Jul. 25, 2019  (JP) .............. JP2019-137044

(51) Int. Cl.
G02B 6/38 (2006.01)
G02B 6/42 (2006.01)

(52) U.S. Cl.
CPC ......... *G02B 6/3847* (2013.01); *G02B 6/4201* (2013.01); *G02B 6/4204* (2013.01); *G02B 6/4206* (2013.01); *G02B 6/4246* (2013.01); *G02B 6/4251* (2013.01); *G02B 6/4292* (2013.01)

(58) Field of Classification Search
CPC .. G02B 6/3847; G02B 6/4201; G02B 6/4204; G02B 6/4206; G02B 6/4246; G02B 6/4251; G02B 6/4292
USPC ............................ 385/33, 88–94
See application file for complete search history.

(56) References Cited

U.S. PATENT DOCUMENTS

2015/0168654 A1 * 6/2015 Hatcher ............... G02B 6/3826
385/60

FOREIGN PATENT DOCUMENTS

JP 2012-009750 A 1/2012

\* cited by examiner

*Primary Examiner* — Michael P Mooney
(74) *Attorney, Agent, or Firm* — Sughrue Mion, PLLC

(57) ABSTRACT

An optical connector is provided which can prevent contamination of a lens body with dust or its scratching without a dust cap when being not mated with a partner optical connector. An optical connector is configured to be mounted on a board and to be mated with a partner optical connector which is connected to a terminal end of an optical fiber. The optical connector includes a housing, an optic transceiver, a lens body and a shield case. The housing includes a tubular section for receiving an optical fiber and a ferrule of a partner optical connector. The lens body is located on one side of the tubular section, wherein a film for closing the tubular section is molded integrally with the tubular section on another side of the tubular section. The film is configured to be broken by inserting the optical fiber and the ferrule into the tubular section.

3 Claims, 5 Drawing Sheets

OPTICAL CONNECTOR, TERMINAL END STRUCTURE FOR AN OPTICAL FIBER

BACKGROUND OF THE INVENTION

Technical Field

The present invention relates to an optical connector with an optic transceiver (FOT: Fiber Optic Transceiver), and a terminal end structure for an optical fiber with the optical connector and a partner optical connector.

Background Art

Conventionally, a board and an optical fiber are connected via a pair of optical connectors e.g. in an automobile LAN. One of the pair of optical connectors which is a "board side optical connector" includes an optic transceiver connected to a board, a lens, a housing accommodating them etc. The other of the optical connectors which is an "optical fiber side optical connector" includes ferrules, a housing accommodating the ferrules etc., the ferrules being attached to respective ends of two optical fibers.

A mating space for receiving the optical fiber side optical connector is formed in the housing for the board side optical connector. By mating the optical fiber side optical connector with the mating space, end faces of the optical fibers are oriented toward the lens. Then, light is transferred from one optical fiber through the lens to a light receiver element of the optic transceiver, and transferred from a light emitting element of the optic transceiver through the lens to the other optical fiber (see e.g. Patent Document 1).

Further, Patent Document 1 discloses that by fitting a dust cap to the mating space of the board side optical connector, dust etc. is prevented from entering the mating space when the optical fiber side optical connector is not mated with the mating space of the board side optical connector, so that contamination of the lens with dust and/or its scratching are prevented.

CITATION LIST

Patent Literature

Patent Document 1: JP 2012-9750 A

SUMMARY OF THE INVENTION

According to Patent Document 1, there is a problem that the dust cap used is separate from the board side optical connector, which increases the number of components and complexity of management. Further, two operations are necessary, i.e. fitting the dust cap to the board side optical connector and removing the dust cap before mating the connector, which increases the number of operation steps.

In order to solve the above-mentioned problem, an objective of the present invention is to provide an optical connector and a terminal end structure for an optical fiber with the optical connector and a partner connector which can prevent contamination of the lens body with dust and/or its scratching without a separate dust cap when being not mated with a partner optical connector.

The present invention provides an optical connector including a housing made of resin, an optic transceiver accommodated into the housing, a lens body accommodated into the housing, the lens body configured to be interposed between a partner optical connector and the optic transceiver, wherein the housing includes a tubular section for receiving an optical fiber and a ferrule of the partner optical connector, wherein the lens body is located on one side of the tubular section, wherein a film for closing the tubular section is molded integrally with the tubular section on another side of the tubular section, and wherein the film is configured to be broken by inserting the optical fiber and the ferrule into the tubular section.

With the film molded integrally with the tubular section, the optical connector according to the present invention can prevent that dust etc. enters the tubular section when a partner optical connector is not mated, which can prevent contamination of the lens body with dust and/or its scratching etc. This eliminates the necessity of a separate dust cap as conventionally. Further, the film is configured to be broken by inserting the optical fiber and the ferrule of the partner optical connector into the tubular section, which eliminates the necessity of a step for breaking the film before mating the connector. In this manner, the present invention can prevent contamination of the lens body of the optical connector with dust and/or its scratching without an increase in the number of components and/or the number of operation steps.

DETAILED DESCRIPTION OF THE PREFERRED EMBODIMENTS

An "optical connector" as well as a "terminal end structure for an optical fiber" with the optical connector and a partner optical connector according to some embodiments of the present invention shall be described with reference to FIGS. 1-7.

Figure 1:
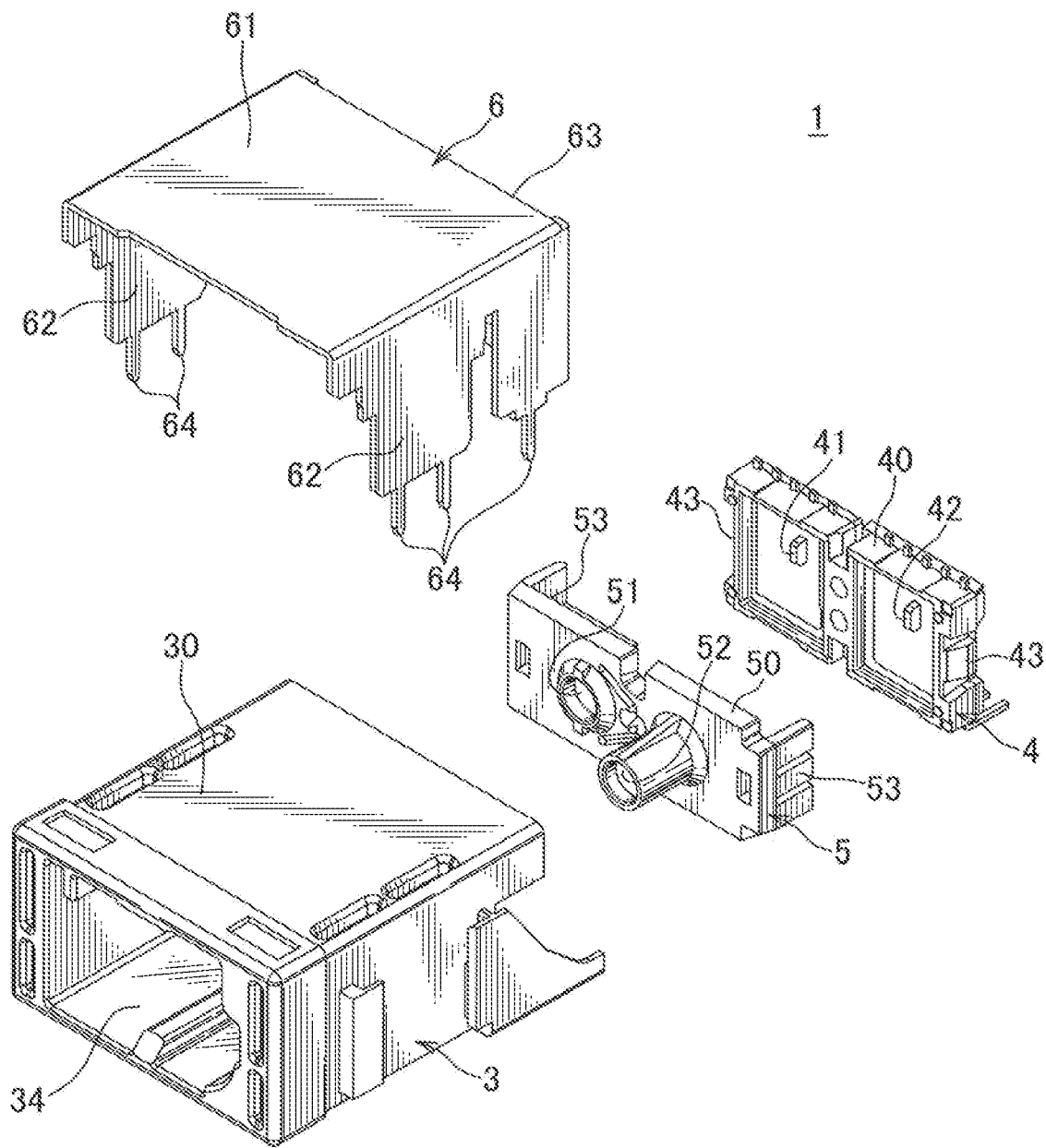
FIG. 1 shows an exploded view of an optical connector according to an embodiment of the present invention.
Figure 2:
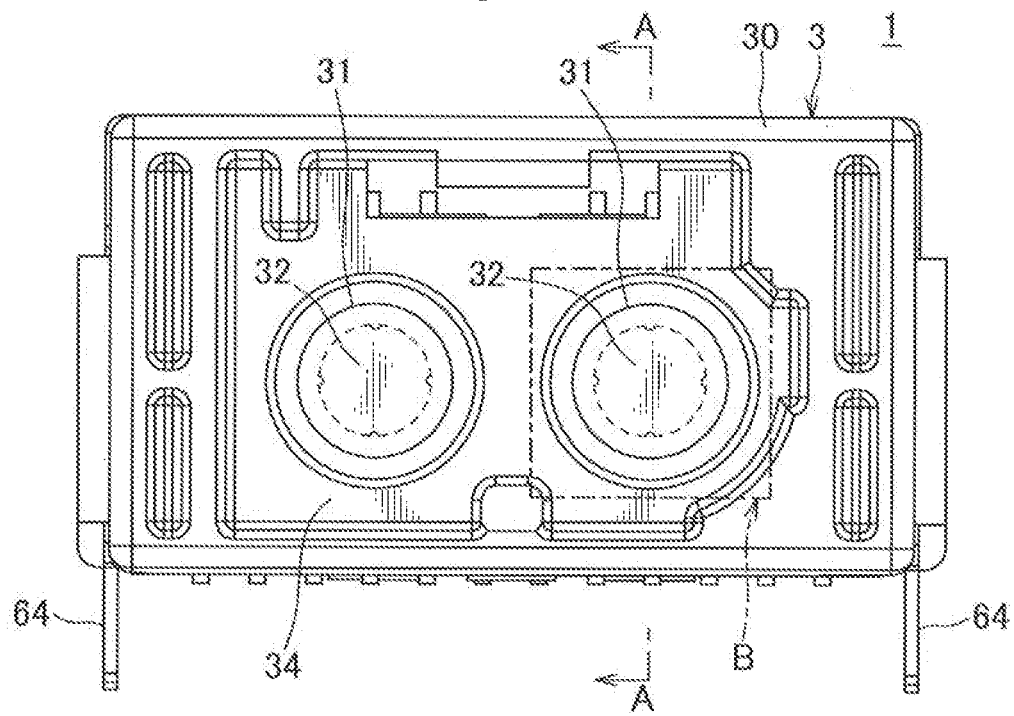
FIG. 2 shows a front view of the optical connector according to FIG. 1.
Figure 3:
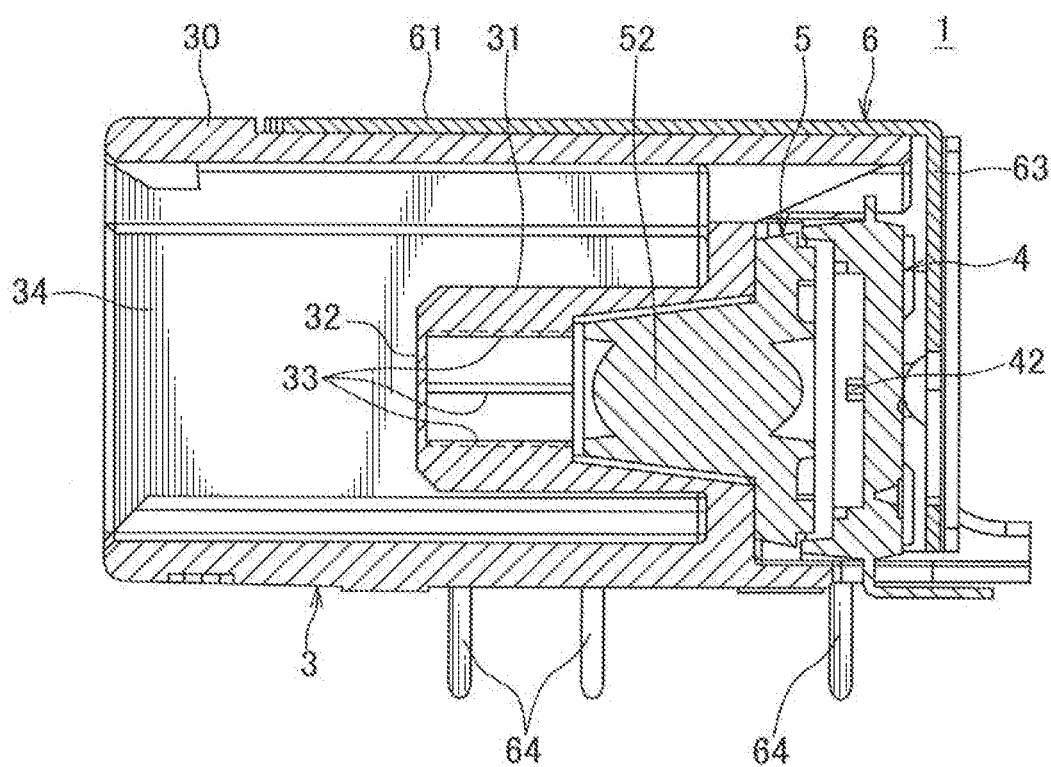
FIG. 3 shows a cross sectional view along the line A-A shown in FIG. 2.
Figure 4:
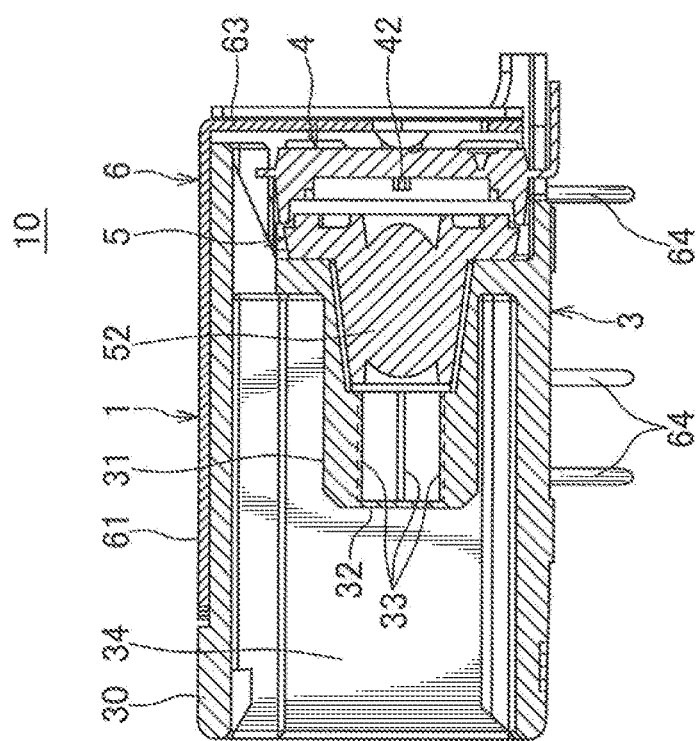
FIG. 4 shows a cross sectional view of the optical connector and a partner optical connector in a non-mated state.
Figure 4:
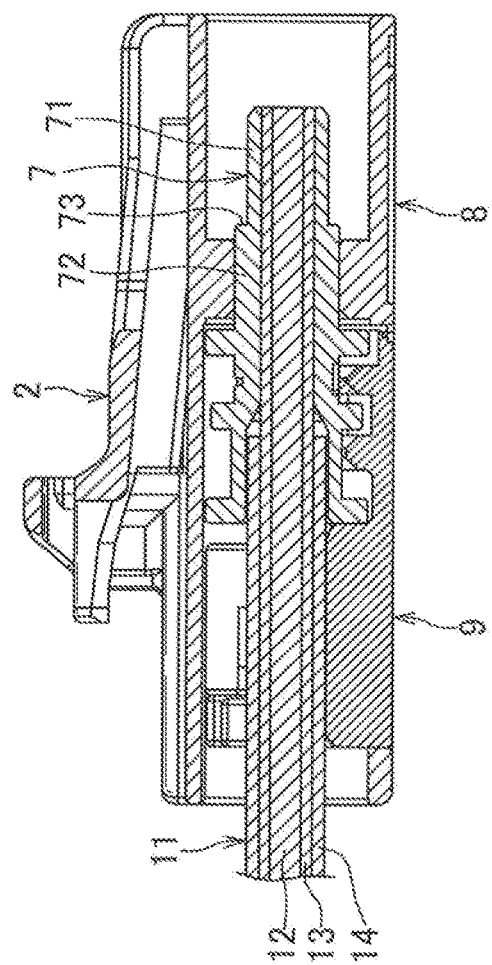
Figure 5:
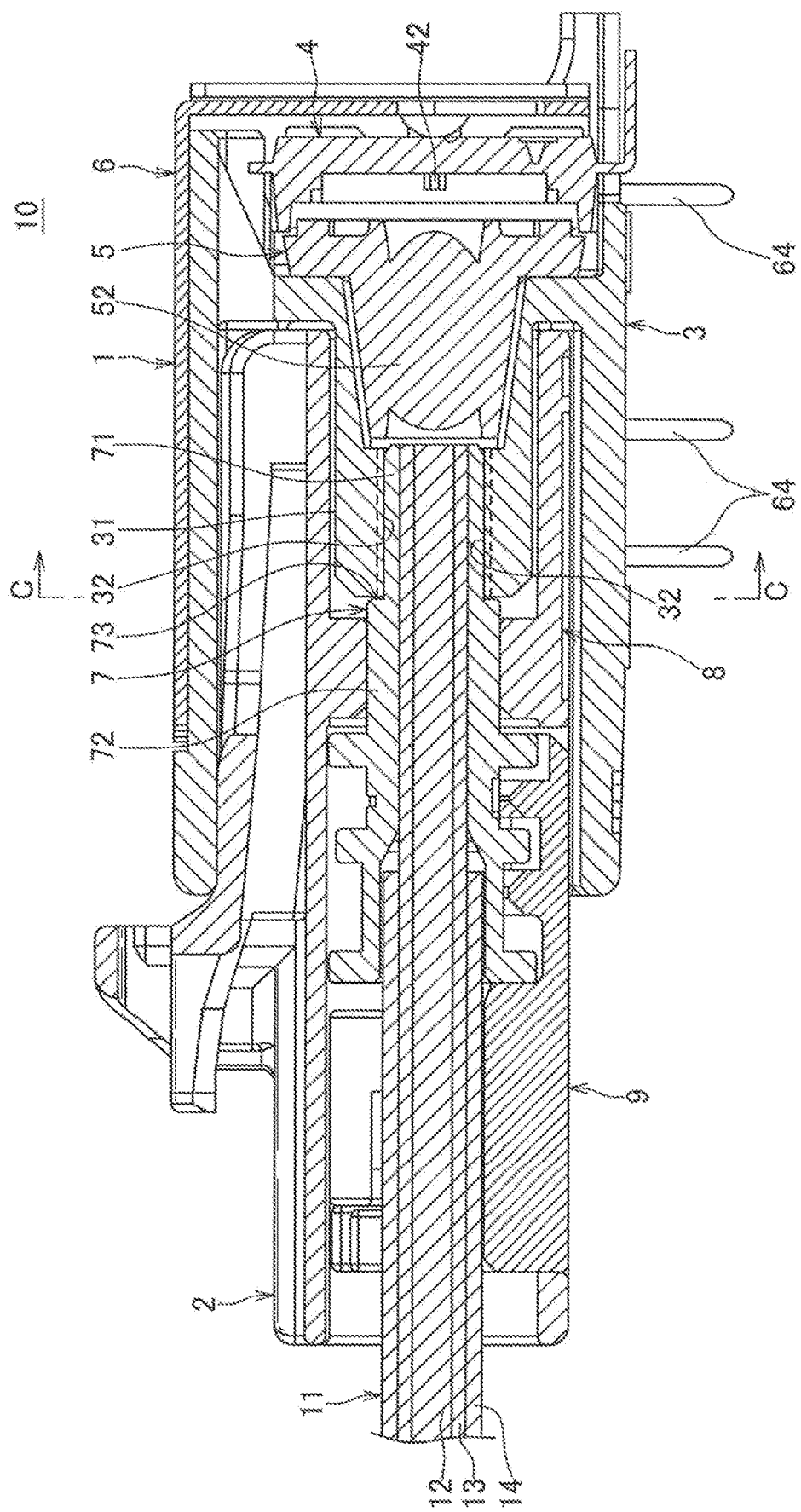
FIG. 5 shows a cross sectional view of the optical connector and the partner optical connector from FIG. 4 in a mated state.

An optical connector 1 as shown in FIGS. 1-3 is configured to be mounted on a board. As shown in FIGS. 4 and 5, the optical connector 1 is configured to be mated with a partner optical connector 2 which is connected to terminal ends of optical fibers 11. A combination of the optical connector 1 and the partner optical connector 2 shall be referred to, whether being in a mated state or in a non-mated state, as a "terminal end structure 10 for an optical fiber".

As shown in FIG. 4, the partner optical connector 2 includes ferrules 7 made of resin, a housing 8 made of resin which accommodates the ferrules 7, and a holder 9 incorporated into the housing 8, the ferrules 7 being attached to respective ends of two optical fibers 11, and the holder 9 being configured to prevent the ferrules 7 from removal. The two optical fibers 11 are arranged in a normal direction to a figure plane of FIG. 4.

Each of the two optical fibers 11 is formed from a bare fiber 12, a primary coating 13 covering the bare fiber 12, and an outermost secondary coating 14, wherein the bare fiber 12 is formed from a core and a cladding. Each of the optical fibers 11 is inserted into the ferrule 7, with the secondary coating 14 being removed at the end of the optical fiber 11.

The ferrule 7 has a small diameter section 71 with a cylindrical shape located closer to an end face of the optical fiber 11, and a large diameter section 72 with a cylindrical shape having a larger diameter than the small diameter section 71. A step 73 is formed at a transition between the small diameter section 71 and the large diameter section 72. The step 73 comes into contact with a tubular section 31 as described later when the partner optical connector 2 is mated with the optical connector 1.

As shown in FIG. 1, the optical connector 1 includes a housing 3 made of resin, an optic transceiver (FOT: Fiber Optic Transceiver) 4 accommodated into the housing 3, and a lens body 5 accommodated into the housing 3, and a shield case 6, wherein the lens body 5 is configured to be interposed between the partner optical connector 2 and the optic transceiver 4.

The housing 3 includes an outer wall section 30 with a quadrilateral-tubular shape and tubular sections 31 arranged in an inside space of the outer wall section 30 in an integrated manner. As shown in FIGS. 3 and 4, the tubular sections 31 in the inside space of the outer wall section 30 accommodate the lens body 5 and the optic transceiver 4 on their one side. Further, as shown in FIG. 5, the partner optical connector 2 is mated with the tubular sections 31 in the inside space of the outer wall section 30 on their other side. The space on the other side shall be referred to as a "mating space 34".

The tubular sections 31 serve for receiving and positioning optical fibers 11 and ferrules 7 of the partner optical connector 2. The tubular sections 31 are formed in a cylindrical shape corresponding to a tip shape of the ferrules 7. Further, two tubular sections 31 are provided as shown in FIG. 2, wherein the two tubular sections 31 are arranged in a width direction of the housing 3 (normal directions to the figure planes of FIGS. 3 and 4). A central axis of each of the tubular sections 31 extends in parallel to a central axis of the outer wall section 30 (i.e. a mating direction of the partner optical connector 2).

On the other side of each of the tubular sections 31, i.e. at its end facing the mating space 34, a film 32 for closing the tubular section 31 is formed integrally with the tubular section 31. The film 32 serves to prevent dust etc. from entering the tubular section 31 when the partner optical connector 2 is not mated. The film 32 is configured to be broken by inserting the optical fiber 11 and the ferrule 7 of the partner optical connector 2 into the tubular section 31. More particularly, the film 32 is formed from thick sections 32a with a larger thickness, and thin sections 32b with a smaller thickness.

A plurality of ribs 33 is formed on an inner surface of the tubular section 31, wherein the ribs 33 extend along an axial direction of the tubular section 31. In the present example, four ribs 33 are formed, wherein the four ribs 33 are arranged equidistantly. The four ribs 33 are configured to come into contact with an outer circumferential surface of the ferrule 7 which is inserted into the tubular section 31.

Figure 6:
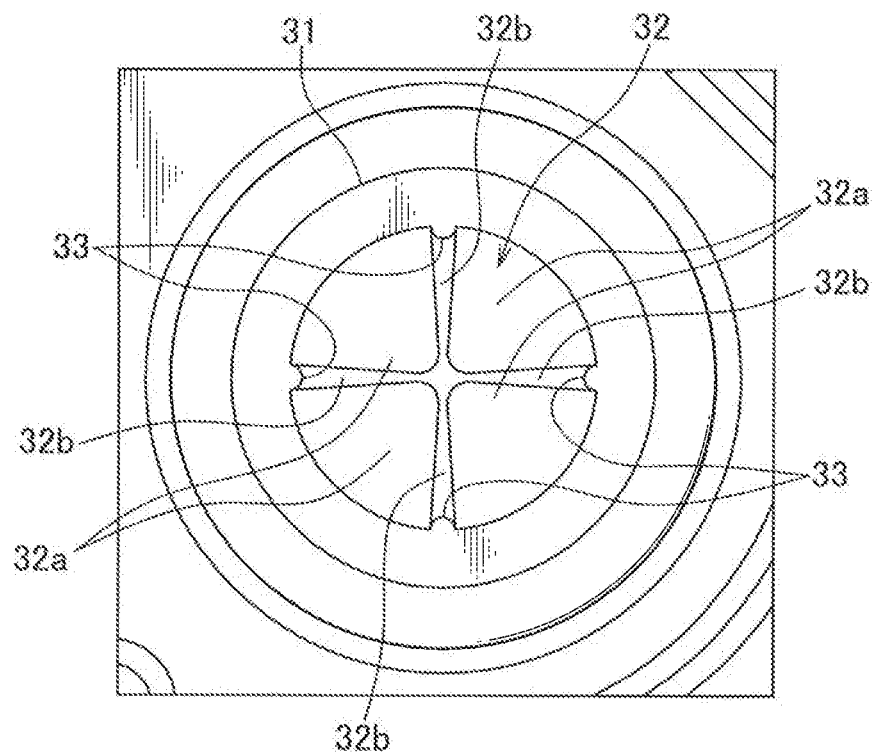
FIG. 6 shows a schematic view of a film in a section B shown in FIG. 2.
Figure 7:
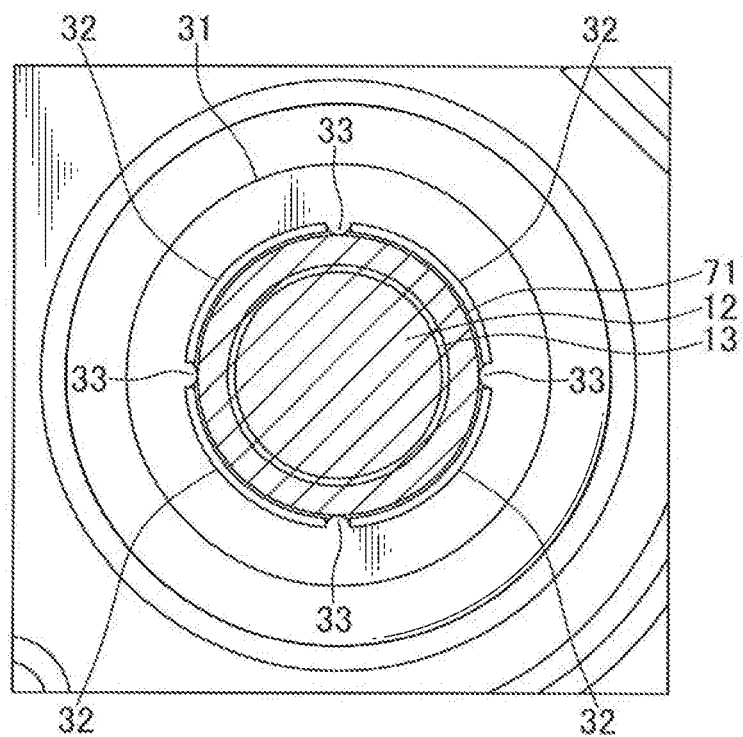
FIG. 7 shows a cross sectional view along the line C-C shown in FIG. 5, showing that the broken film is located in a gap between a ferrule and a tubular section inner surface.

Further, in the present example, the thin sections 32b extend from respective regions of the ribs 33 toward a center of the tubular section 31, and are formed in a cross-shape as indicated in the schematic diagram of FIG. 6. Thus, when the optical fiber 11 and the ferrule 7 of the partner optical connector 2 is inserted into the tubular section 31, the film 32 is torn at the thin sections 32b, i.e. at locations of the ribs 33. This means, in the present example, tears are formed in a cross-shape in the film 32 starting from the respective ribs 33, wherein torn portions are pushed inside by the ferrule 7. Then, in a mated state of the optical connector 1 with the partner optical connector 2, the four ribs 33 are in contact with the outer circumferential surface of the ferrule 7 as indicated in FIG. 7, wherein the broken film 32 is located in a gap between the outer circumferential surface of the ferrule 7 and the inner surface of the tubular section 31.

As shown in FIG. 1, the optic transceiver 4 includes electronic components, such as a light emitting element (a light emitting diode, a laser diode etc.) 41 and a light receiving element (photodiode etc.) 42, and a holder 40 made of resin which holds these electronic components. A pair of locking projections 43 are formed at opposite ends of the holder 40, the locking projections 43 being configured to engage with the lens body 5.

The lens body 5 includes a lens section 51 configured to be interposed between the light emitting element 41 and one optical fiber 11, a lens section 52 configured to be interposed between the light receiving element 42 and the other optical fiber 11, a plate section 50 integrated with the lens sections 51 and 52, and a pair of locking arms 53 arranged at opposite ends of the plate section 50, in an integrated manner. In the present example, the lens section 52 is formed with a larger thickness than the lens section 51.

The optic transceiver 4 and the lens body 5 are assembled together by engaging the locking projections 43 with the locking arms 53, wherein in this assembled state, the optic transceiver 4 and the lens body 5 are incorporated into the housing 3. In this state, the lens body 5 is positioned on one side of the two tubular sections 31 (opposite to the mating space 34), wherein the lens section 52 is largely positioned in one of the tubular sections 31, as described above. Similarly to the lens section 52, the lens section 51 is largely positioned in the other of the tubular sections 31, although it is not shown.

The shield case 6 is obtained by applying e.g. a pressing process to a metal sheet. As indicated in FIGS. 1 and 3, the shield case 6 includes an upper surface section 61 covering an upper surface of the outer wall section 30, a pair of side surface sections 62 covering both side surfaces of the outer wall section 30, a back surface section 63 covering the optic transceiver 4, and board connecting sections 64 extending from the respective side surface sections 62.

With the films 32 integrated with the tubular sections 31, the optical connector 1 as described above can prevent that dust etc. enters the tubular sections 31 when the partner optical connector 2 is not mated, which can prevent contamination of the lens sections 51 and 52 with dust and their scratching. This eliminates the necessity of a separate dust cap as conventionally. Further, the films 32 are configured to be broken by inserting the optical fibers 11 and the ferrules 7 of the partner optical connector 2 into the tubular sections 31, which eliminates the necessity of a step for breaking the films 32 before mating the connectors.

In this manner, the present invention can prevent contamination of the lens sections 51 and 52 of the optical connector 1 with dust and/or their scratching without an increase in the number of components and/or the number of operation steps. Further, the present example does not need a separate dust cap, which enables a cost reduction for the optical connector 1.

It is to be noted that the embodiments as described above merely illustrate representative examples for the present invention, and the present invention is not limited to these embodiments. I.e., various modifications may be performed without departing from the core of the present invention. It is obvious that such modifications are included in the scope of the present invention as far as the modifications comprise the features of the present invention.

REFERENCE SIGNS LIST

1 Optical connector
2 Partner optical connector
3 Housing
4 Optic transceiver
5 Lens body
7 Ferrule
10 Terminal end structure for optical fibers
11 Optical fiber
31 Tubular section
32 Film
33 Rib

What is claimed is:

1. An optical connector comprising:
a housing made of resin;
an optic transceiver accommodated into the housing; and
a lens body accommodated into the housing, the lens body configured to be interposed between a partner optical connector and the optic transceiver,
wherein the housing includes a tubular section for receiving an optical fiber and a ferrule of the partner optical connector,
wherein the lens body is located on one side of the tubular section, wherein a film for closing the tubular section is molded integrally with the tubular section on another side of the tubular section, and
wherein the film is configured to be broken by inserting the optical fiber and the ferrule into the tubular section.

2. The optical connector according to claim 1, wherein a plurality of ribs is formed on an inner surface of the tubular section, wherein the plurality of ribs extends along an axial direction of the tubular section.

3. A terminal end structure for an optical fiber, comprising:
the optical connector according to claim 2; and
the partner optical connector configured to be mated with the optical connector,
wherein in a mated state of the optical connector with the partner optical connector,
the plurality of ribs is in contact with the ferrule of the partner optical connector, and
the film which is broken is located in a gap between the ferrule and the inner surface of the tubular section.

* * * * *